United States Patent
Brenner et al.

(10) Patent No.: US 9,261,344 B2
(45) Date of Patent: Feb. 16, 2016

(54) PROBE HEAD FOR A COORDINATE MEASURING MACHINE FOR DETERMINING SPATIAL COORDINATES ON A MEASUREMENT OBJECT

(71) Applicant: Carl Zeiss Industrielle Messtechnik GmbH, Oberkochen (DE)

(72) Inventors: Kurt Brenner, Satteldorf (DE); Walter Jenisch, Heidenheim (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 467 days.

(21) Appl. No.: 13/666,999

(22) Filed: Nov. 2, 2012

(65) Prior Publication Data
US 2013/0055832 A1   Mar. 7, 2013

Related U.S. Application Data

(63) Continuation of application No. PCT/EP2011/056305, filed on Apr. 20, 2011.

(30) Foreign Application Priority Data

May 7, 2010   (DE) .................. 10 2010 020 654

(51) Int. Cl.
*G01B 5/004*   (2006.01)
*G01B 5/012*   (2006.01)
(Continued)

(52) U.S. Cl.
CPC .............. *G01B 5/012* (2013.01); *G01B 5/008* (2013.01); *G01B 21/04* (2013.01); *G01B 21/045* (2013.01); *G01D 11/245* (2013.01); *G01D 11/30* (2013.01)

(58) Field of Classification Search
CPC ...... G01B 5/008; G01B 21/04; G01B 21/045; G01D 11/30; G01D 11/245

USPC ........ 33/559, 558.01, 558.3, 558.4, 503, 556, 33/557, 558, 560, 561; 73/866.3
See application file for complete search history.

(56) References Cited

U.S. PATENT DOCUMENTS 4,349,946 A * 9/1982 McMurtry ........................ 29/57
4,631,834 A * 12/1986 Hayashi et al. .................. 33/503
(Continued)

FOREIGN PATENT DOCUMENTS

| AT | 397 137 B | 2/1994 |
|----|-----------|--------|
| DE | 101 14 126 A1 | 10/2001 |

(Continued)

OTHER PUBLICATIONS

ISA/EP; English translation of International Preliminary Report on Patentability (Chapter 1); issued by WIPO Nov. 13, 2012; 7 pages.

*Primary Examiner* — Laura Martin
*Assistant Examiner* — Rhyan C Lange
(74) *Attorney, Agent, or Firm* — Harness, Dickey & Pierce, P.L.C.

(57) ABSTRACT

A probe head for a coordinate measuring machine has a coupling part having a retaining pin, on which a probe tool is detachably arranged. The probe tool has at least one stylus for touching a measurement object, and a rotary plate. The rotary plate is coupled to the coupling part by means of the retaining pin in one of a plurality of defined rotation angle positions. Moreover, the rotary plate has a latching mechanism including at least one adjustable latching element and a detector. The latching element has a latching position in which it fastens the rotary plate on the retaining pin, and it has a release position in which it releases the retaining pin. The detector generates a signal which is representative of at least one from the latching position and the release position.

24 Claims, 9 Drawing Sheets

(51) Int. Cl.
*G01B 3/00* (2006.01)
*G01B 5/00* (2006.01)
*G01B 3/16* (2006.01)
*G01B 21/04* (2006.01)
*G01D 11/30* (2006.01)
*G01B 5/008* (2006.01)
*G01D 11/24* (2006.01)

(56) References Cited

U.S. PATENT DOCUMENTS

| | | | |
|---|---|---|---|
| 5,035,457 A * | 7/1991 | Tveit et al. | 294/86.4 |
| 5,088,337 A | 2/1992 | Bennett | |
| 5,185,936 A * | 2/1993 | McMurtry | 33/572 |
| 5,971,903 A | 10/1999 | Hajdukiewicz | |
| 7,543,394 B2 * | 6/2009 | Enderle et al. | 33/503 |
| 8,365,426 B2 * | 2/2013 | Ruck | 33/503 |
| 2004/0149057 A1 * | 8/2004 | Jordil et al. | 73/866.5 |
| 2005/0207857 A1 | 9/2005 | Jordil et al. | |
| 2012/0079731 A1 | 4/2012 | Ruck | |
| 2012/0246953 A1 * | 10/2012 | Engel | 33/502 |

FOREIGN PATENT DOCUMENTS

| | | |
|---|---|---|
| DE | 10 2005 043 454 B3 | 5/2007 |
| DE | 102007022326 A1 * | 11/2008 |
| DE | 10 2009 008 722 A1 | 8/2010 |
| EP | 0 392 660 A2 | 10/1990 |
| EP | 392660 A2 * | 10/1990 |
| EP | 0 523 906 A1 | 1/1993 |
| EP | 0 856 377 A1 | 8/1998 |
| EP | 856377 A1 * | 8/1998 |

* cited by examiner

PROBE HEAD FOR A COORDINATE MEASURING MACHINE FOR DETERMINING SPATIAL COORDINATES ON A MEASUREMENT OBJECT

CROSS REFERENCES TO RELATED APPLICATIONS

This application is a continuation of international patent application PCT/EP2011/056305 filed on Apr. 20, 2011 designating the U.S., which international patent application has been published in German and claims priority from German patent application DE 10 2010 020 654.7 filed on May 7, 2010. The entire contents of these prior applications are incorporated herein by reference.

BACKGROUND OF THE INVENTION

The present invention relates to a probe head for a coordinate measuring machine for determining spatial coordinates on a measurement object, and to a probe tool for such a probe head.

Coordinate measuring machines are typically used for determining geometrical dimensions and/or the shape of workpieces. In general, the coordinate measuring machine has a measurement head which can be moved relative to the workpiece (hereafter measurement object). Depending on the position of the measurement head relative to the workpiece, spatial coordinates are determined which represent the position of defined measurement points on the workpiece within a measurement volume. If a plurality of spatial coordinates are determined for a plurality of measurement points, the geometrical dimensions and/or the shape of the measurement object can be checked with the aid of the spatial coordinates.

In many cases, the probe head of a coordinate measuring machine has a probe tool with which the desired measurement points on the measurement object are touched (physical contact). Accordingly, the probe head may be referred to as a touch probe head.

The probe tool often has a stylus with a free end, on which a touch ball is arranged. The desired measurement points on the measurement object are touched with the touch ball. In order to reach all measurement points in the case of complex workpieces, it is often desirable to hold the stylus in different orientations relative to the probe head. Furthermore, it is often desirable to use probe tools with different styli or styli combinations on a probe head, in order to optimally reach all desired measurement points.

DE 101 14 126 A1 discloses a probe head having a replaceable probe tool. The probe tool has a stylus which is angled in an L-shape and can be fastened on the probe head in different rotation angle positions. A rotary plate of the probe tool is arranged in a defined rotation angle position on the probe head by means of a kinematic three-point bearing. In order to change the rotation angle position, the rotary plate is disengaged from the three-point bearing by means of a pneumatically actuated push-rod and subsequently rotated on the push-rod by means of a rotary drive arranged in the probe head. The rotary plate is then re-engaged into the defined three-point bearing. The rotation angle position of the rotary plate and of the stylus arranged thereon is determined by a sensor, which at the same time also delivers signals for the rotary drive. In order to prevent the rotary plate from falling when the stylus is being rotated, the rotary plate is fastened on the push-rod by a hook-shaped connection. Further safeguarding of the rotary plate against falling during the rotation process is not disclosed.

The known probe head makes it possible to use different probe tools with different orientations. It is therefore suitable for flexible measurements on complex measurement objects. Disadvantages are the rotary drive integrated in the probe head and the pneumatically actuated push-rod, which are required in addition to the probe head sensors with which displacements of the stylus relative to the probe head are determined. Depending on the frequency of use, the rotary drive generates heat which can have an unfavorable effect on the measurement accuracy of the probe head. Furthermore, integration of the additional components into the probe head leads to heavier weight.

In U.S. patent application Ser. No. 13/198,845, published as US 2012/0079731 A1, the assignee has described a probe head for a coordinate measuring machine, in which the probe tool can be rotated using measurement force generators and a so-called roll motion projection. Measurement force generators are actually used in so-called active probe heads to adjust and ensure a defined sampling force when a measurement point is being touched. They are present in active probe heads, and according to the concept described in US 2012/0079731 A1, they are also used for rotating the probe tool. Accordingly, this probe head avoids the disadvantages of the probe head of DE 101 14 126 A1.

In the case of the probe head of US 2012/0079731 A1, the rotary plate of the probe tool is fastened on a retaining pin, by means of which the rotary plate can be disengaged from its kinematic bearing for the rotational movement. In test operation, it has been found that the fastening of the rotary plate on the retaining pin is a critical point. If the retaining pin and/or the rotary plate are contaminated, for example, it is possible that the fastening of the rotary plate on the retaining pin will be insufficient and the probe tool can loosen and fall during rotation on the roll motion projection. This may cause damage to the probe tool and/or the measurement object.

DE 10 2005 043 454 B3 discloses a change device for replaceable reception of a probe tool on a coordinate measuring machine, a safety cable ensuring that the probe tool does not fall out of the holder even in the event of collision, even though the probe tool can detach from the holder in the event of a collision in order to avoid damage. A similar safety mechanism is also described in the aforementioned prior application US 2012/0079731 A1. This safety mechanism, however, does not offer protection against the probe tool falling out when the fastening of the probe tool on the retaining pin is already insufficient.

EP 0 523 906 A1 discloses a further probe head having a rotatable probe tool. The probe tool is in this case retained magnetically on the probe head. A retaining magnet for holding the probe tool is connected to a shaft which can be rotated by means of a motor specially provided therefor. In order to rotate the probe head, the retaining magnet is moved forward together with the shaft, so that the probe tool is disengaged from its working position. With the aid of the motor, the probe tool is then rotated. Subsequently, the shaft is pulled back into its original position, the retaining magnet being released from the probe tool. Here again, no particular security is provided against the probe tool falling during rotation.

SUMMARY OF THE INVENTION

Against this background, it is an object of the present invention to provide a probe head, wherein the probe tool is better protected against damage due to falling particularly during rotation. Preferably, the new probe head is intended to function without a special rotary drive for rotating the probe tool, although the invention is generally not restricted thereto.

According to one aspect of the invention, there is provided a probe head for a coordinate measuring machine for determining spatial coordinates on a measurement object, comprising a coupling part having a retaining pin, on which a probe tool is arranged; a body part on which the coupling part is moveably mounted; at least one measurement force generator configured to effect a defined movement of the coupling part relative to the body part; and a roll motion projection formed on the body part; wherein the probe tool comprises at least one stylus for touching the measurement object and a rotary plate coupled to the coupling part by means of the retaining pin, said rotary plate being configured to be rolled along the roll motion projection as a result of the defined movement of the coupling part relative to the body part in order to set a rotation angle position of the at least one stylus, wherein the rotary plate comprises a latching mechanism having at least one adjustable latching element and a detector, the latching element having a latching position in which it secures the rotary plate on the retaining pin, and at least one release position in which it releases the retaining pin, and wherein the detector is configured to generate a signal which is representative of at least one from the latching position and the release position.

According to a further aspect, there is provided a probe tool for a probe head having a retaining pin for holding the probe tool, said probe tool comprising at least one stylus for touching a measurement object and comprising a rotary plate designed to be coupled to the probe head by means of said retaining pin in one of a plurality of defined rotation angle positions, wherein the rotary plate comprises a latching mechanism having at least one adjustable latching element and a detector, the latching element having a latching position in which it fastens the rotary plate on the retaining pin, and at least one release position in which it releases the retaining pin, and wherein the detector is configured to generate a signal which is representative of at least one of the latching position and the release position.

According to yet another aspect, there is provided a probe head for a coordinate measuring machine for determining spatial coordinates on a measurement object, the probe head comprising a coupling part having a retaining pin, on which a probe tool is detachably arranged, the probe tool comprising at least one stylus for touching the measurement object and a rotary plate, which is coupled to the coupling part by means of the retaining pin in one of a plurality of defined rotation angle positions, wherein the rotary plate comprises a latching mechanism having at least one adjustable latching element and a detector, the latching element having a latching position in which it fastens the rotary plate on the retaining pin, and at least one release position in which it releases the retaining pin, and the detector generating a signal which is representative of at least one of the latching position and the release position.

The new probe head and the new probe tool have a latching mechanism, which is arranged on the rotary plate of the probe tool. Fastening of the probe tool on the probe head is thus at least partially achieved by the rotary plate, and is not merely subject to the receptacle for the rotary plate in the probe head. Furthermore, the rotary plate has a detector, with the aid of which the function of the latching mechanism is monitored. The detector generates a signal which is representative of the latching position and/or the release position of the latching element. Accordingly, the signal is designed to indicate the respective position of the latching element. Preferably, the detector signal is evaluated in the probe head in order to detect insufficient fastening of the rotary plate on the retaining pin as early as possible, and to deliver a warning signal to the user of the machine and/or to trigger an operational shutdown as a function thereof. It is furthermore preferred, if an evaluation and control unit, which may optionally be arranged in the probe head or separately from the probe head, prevents disengagement of the rotary plate and a change in the rotation angle position, as the case may be, as a function of the signal of the detector.

The new probe head and the new probe tool thus have a dedicated detector, which allows monitoring of the latching mechanism with the aid of a dedicated monitoring signal. As an alternative or in addition to this, the latching mechanism could be formed so as to be failsafe, for example by a mechanical design which rules out fastening of the probe tool with insufficient latching. The use of a detector to generate a dedicated monitoring signal, however, simplifies the mechanical design of the interface between the rotary plate and the coupling part. Furthermore, the detector allows alterations of the mechanical interface between the rotary plate and the coupling part to be taken into account. Alterations which have an effect on the function of the latching mechanism, and which do not occur until during operation of the coordinate measuring machine, may for instance be a result of contamination, wear and/or incorrect operation. The detector allows very reliable and economical monitoring of the latching function. Furthermore, integration of the detector in the probe tool is advantageous in order to simplify retrofitting of older coordinate measuring machines.

As will be explained below with respect to preferred exemplary embodiments, the new probe head may advantageously be produced without a special rotary drive for rotating the probe tool by using one or more measurement force generators in the probe head, in order to generate a desired rotational movement using a roll motion projection. The detector, integrated in the probe tool, for monitoring a latching element integrated in the probe tool may, however, also be used advantageously in probe heads which have a special rotary drive for rotating the probe tool.

In a preferred refinement, the rotary plate has at least one identification circuit, and the coupling part has a sensor for reading the at least one identification circuit.

An identification circuit in the context of this refinement is a—preferably electronic—circuit, which contains encoding that identifies the rotary plate. A preferred identification circuit comprises a memory in which the encoding is digitally stored. In principle, however, the identification circuit could comprise mechanical encoding which can be read mechanically, electrically and/or optically by a suitable sensor in the coupling part. The preferred refinement has the advantage that the probe head can recognize the identity and properties of the probe tool in a simple and automated fashion, for example in order to determine the number of possible rotation angle positions and/or the presence of the new detector.

In another refinement, the detector is designed to prevent the identification circuit from being read by the sensor depending on the latching position and/or the release position.

This refinement allows very simple, economical and compact production of the detector, by the detector using the encoding delivered anyway by the identification circuit, in order to generate the monitoring signal for the latching mechanism. In a preferred exemplary embodiment, the detector prevents the identification circuit from being read when the latching element is not in its latching position, i.e. it is in a release position of whatever type. The "signal" of the detector consists in this case in the sensor receiving no signal from the identification circuit. The detector may therefore be a passive element, which causes no additional heat generation in the probe head.

In a further refinement, the detector comprises an electrical switch, which is arranged electrically in series with the at least one identification circuit.

This refinement allows very simple, economical and reliable production of the detector. The electrical switch is preferably a mechanically actuated microswitch, which is closed only when the latching element is in its latching position. Such a switch can be integrated well in the small installation space of a rotary plate, and it can prevent reading of the identification circuit very efficiently.

In a further refinement, the rotary plate has a plurality of identification circuits, with each identification circuit being representative of one of the defined rotation angle positions, and the detector is designed to prevent the identification circuit from being read by the sensor depending on the latching position and/or the release position.

Preferably, in this refinement, an individual identification circuit is provided for each defined rotation angle position. The probe head can determine the current rotation angle position of the rotary plate very efficiently in this refinement with the aid of the individual identification circuit, which is read by the sensor. It is advantageous for the detector to be formed so as to prevent reading of the plurality of identification circuits, since in this case only one detector is required. In a preferred exemplary embodiment, the detector comprises the aforementioned switch, which is arranged in series with the plurality of identification circuits. The refinement allows reliable monitoring of the latching function in each rotation angle position and a compact structure.

In a further refinement, the rotary plate has a plurality of rotary plate latching elements, which define the rotation angle positions, and the at least one identification circuit has a number of electrical contacts which are arranged radially with respect to at least one of the rotary plate latching elements. Preferably, arranged radially with respect to each rotary plate latching element, there is a pair of electrical contacts which are respectively connected to an identification circuit, each identification circuit identifying precisely one rotary plate latching element. It is furthermore preferred that, on the coupling part, a contact pair is arranged which reads precisely one identification circuit in each rotation angle position via the electrical contacts which are assigned to this identification circuit.

The refinement allows rapid and very reliable determination of each defined rotation angle position. The radial arrangement of the electrical contacts furthermore contributes to a compact and clear structure. In addition, this refinement simplifies the preferred production of the detector in the form of a switch electrically arranged in series with all the identification circuits.

In a further refinement, the coupling part comprises a plurality of coupling plate latching elements and a further sensor, the further sensor being designed to detect mechanical contact between at least one coupling plate latching element and at least one rotary plate latching element. Preferably, the coupling plate latching element is formed as a ball or roller pair which forms an intermediate space in which precisely one rotary plate latching element can engage. It is, however, also conceivable for each rotary plate latching element to be a ball or roller pair between which precisely one coupling plate latching element can engage.

The refinement produces a second, independent signal path which can advantageously be used to detect the bearing of the rotary plate on the coupling part. The further sensor does not, however, replace the detector described above, since by itself it does not offer any information in relation to the latching element. Nevertheless, the further sensor allows better monitoring of the latching function since the detector of the rotary plate can deliver the above-described signal to the probe head only when the rotary plate is arranged in the region of the coupling part. The further sensor thus delivers additional information, which is advantageously used to distinguish between various possible configurations. Furthermore, the further sensor makes it readily possible to establish whether the rotary plate is coupled to the coupling part in a kinematically uniquely defined rotation angle position and/or whether it is disengaged from the kinematic bearing for rotation.

In a further refinement, the latching mechanism comprises two, preferably spring-loaded, sliding members, which can be displaced counter to one another in order to bring the at least one latching element into the release position.

Two counter-running sliding members allow simple and reliable opening and closing of the latching mechanism. Furthermore, a latching mechanism comprising at least two counter-running latching elements is robust and tolerant to slight positioning inaccuracies when fitting the rotary plate. Such inaccuracies are compensated for by the counter-running elements. Spring-loaded sliding members have the advantage that they ensure a defined resting position, in which the rotary plate is preferably latched on the retaining pin.

The preferred sliding members each have a free end, the free ends lying diametrically opposite one another in the resting position and protruding radially beyond the rotary plate edge. This refinement allows simple manual activation and highly reproducible machine actuation of the latching mechanism.

In a further refinement, the probe head has a body part on which the coupling part is moveably mounted, and at least one measurement force generator which is designed to effect a movement of the coupling part relative to the body part.

This refinement involves an active probe head comprising at least one measurement force generator, which is capable of displacing the probe tool arranged on the coupling part in a defined direction, or generating a defined measurement force when the probe tool abuts on a measurement point. Preferably, the probe head has at least three measurement force generators, which can displace the coupling part in three mutually orthogonal directions. The refinement allows very accurate adjustment of a measurement force and it simplifies automatic path control during the continuous scanning of a measurement object.

In a further refinement, a roll motion projection, on which the rotary plate can be rolled by movement of the coupling part, is formed on the body part.

This refinement uses the concept described in above mentioned US 2012/0079731 A1, which is incorporated by reference herewith, for bringing the rotary plate into a desired rotation angle position with the aid of measurement force generators. The new latching mechanism which is monitored with the aid of the new detector allows reliable fastening of the rotary plate especially in this case, and it avoids in particular damage due to the probe tool falling when the rotary plate is rotated on the roll motion projection. Precisely in this situation, the rotary plate experiences lateral forces which can cause falling when there is fastening but it is not sufficient.

In a further refinement, the roll motion projection is a sleeve, which is arranged essentially concentrically with the rotary plate. Preferably, the sleeve is a cylindrical sleeve which is arranged concentrically with a circular rotary plate.

This refinement allows a very compact structure as well as rapid and position-independent rotation of the rotary plate on the roll motion projection.

In a further refinement, a traction element is arranged between the rotary plate and the roll motion projection. In a preferred variant, the traction element is a rubber-like ring which is arranged on the outer circumference of the rotary plate and which increases the static friction and sliding friction between the rotary plate and the roll motion projection. In a further variant, the traction element has a sandpaper-like surface on the roll motion projection and/or on the outer circumference of the rotary plate. In a further variant, the traction element produces a form fit between the rotary plate and the roll motion projection. For example, the traction element may contain gearing, for instance by the rotary plate comprising outer teeth on the outer circumference which are formed so as to mesh with inner teeth on the roll motion projection.

Such a traction element improves the driving force between the rotary plate and the roll motion projection. Slip is reduced, even if not entirely avoided. The traction element therefore contributes to bringing the rotary plate rapidly and accurately into a desired rotation angle position.

In a further refinement, a stop, by which the retaining pin can be fixed relative to the coupling part, is arranged on the body part.

In the preferred refinements, the retaining pin is arranged on the coupling part in such a way that it can be moved parallel to the rotation axis of the rotary plate. In a first position (latching position), the retaining pin draws the rotary plate into the preferred kinematic three-point bearing. In a second position (rotation position) the retaining pin disengages the rotary plate from the kinematic bearing, in order to permit rotation of the rotary plate. Preferably, the pin is mounted in the rotation position without play in a roller bearing, in order to permit slight rotation of the rotary plate. In the latching position, the retaining pin is preferably arranged at a distance from the bearing element, i.e. it has play inside the bearing element in order to avoid mechanical clamping when touching measurement objects.

The preferred stop has the advantage that the retaining pin can be moved very efficiently relative to the coupling part with the aid of a measurement force generator, by displacing the coupling part parallel to the rotation axis of the rotary plate with the aid of the measurement force generator, while the retaining pin is fixed on the stop. The configuration allows very smooth disengagement and engagement of the rotary plate, wherein use is again made of an integrated measurement force generator in an advantageous manner.

In a further refinement, the coupling part is arranged between the stop and the rotary plate.

This refinement contributes to a particularly compact structure and allows advantageous encapsulation of all the probe head components except for the replaceable probe tool.

It is to be understood that the features mentioned above and those yet to be explained below may be used not only in the respectively indicated combination but also in other combinations or separately, without departing from the scope of the present invention.

BRIEF DESCRIPTION OF THE DRAWINGS

Exemplary embodiments of the invention are illustrated in the drawing and are explained in more detail in the description which follows.

DESCRIPTION OF PREFERRED EMBODIMENTS

Figure 1:
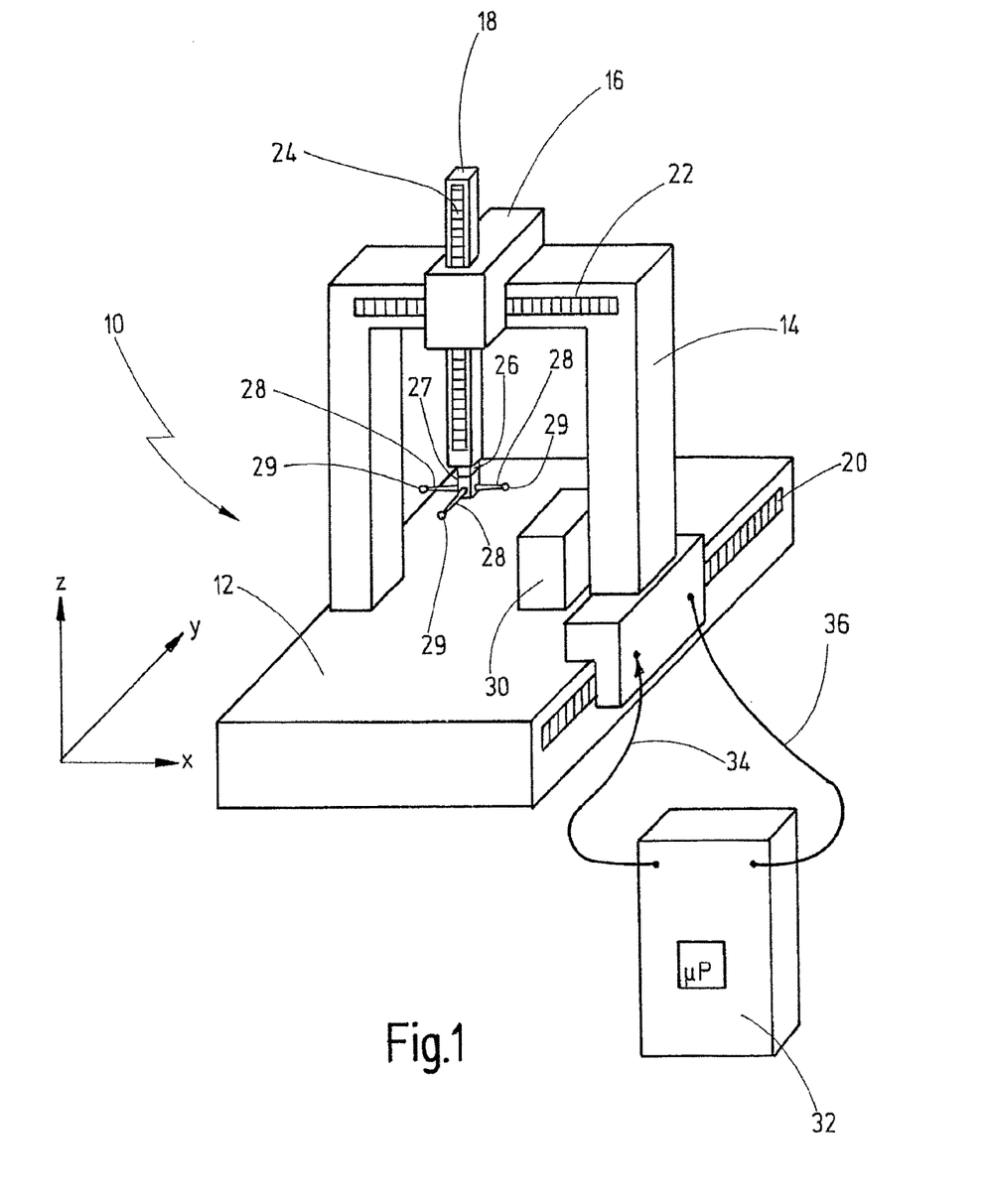
FIG. 1 shows a coordinate measuring machine comprising a probe head according to one exemplary embodiment of the invention.

In FIG. 1, a coordinate measuring machine with the new probe head is denoted overall by reference number 10. The coordinate measuring machine 10 in this case has a base 12, on which a gantry 14 is arranged so that it can be moved in the longitudinal direction. The movement direction of gantry 14 relative to the base 12 is typically denoted as the y axis. On the upper crossbar of the gantry 14, a carriage 16 is arranged which can be moved in the transverse direction. The transverse direction is typically denoted as the x axis. The carriage 16 carries a quill 18, which can be moved in the z direction, i.e. perpendicularly to the base 12. The reference numbers 20, 22, 24 denote measuring instruments, with the aid of which the position of the gantry 14, the carriage 16 and the quill 18 can be determined. Typically, the measuring instruments 20, 22, 24 are glass measuring scales, which are read with the aid of suitable sensors.

A probe head 26, which holds a probe tool 27, is arranged on the lower free end of the quill 18. The probe tool 27 in this case comprises three styli 28, each of which has a ball 29 on its free end. The ball is used to touch a measurement point on a measurement object 30. With the aid of the measuring instruments 20, 22, 24, it is possible to determine the position of the probe head 26 within the measurement volume when the measurement point is touched. As a function of this, spatial coordinates of the sampled measurement point can then be determined.

Reference number 32 denotes an evaluation and control unit, which is connected via lines 34 and 36 to the drives and sensors on the gantry. The control unit 32 is used to operate the motor drive for the movement of the probe head 26 along the three coordinate axes x, y and z. The evaluation and control unit 32 furthermore reads in the measurement values from the measuring instruments 20, 22, 24, and as a function thereof and as a function of displacements of the probe tool 27, it determines the current spatial coordinates of the measurement point and further geometrical values of the measurement object 30.

Figure 2:
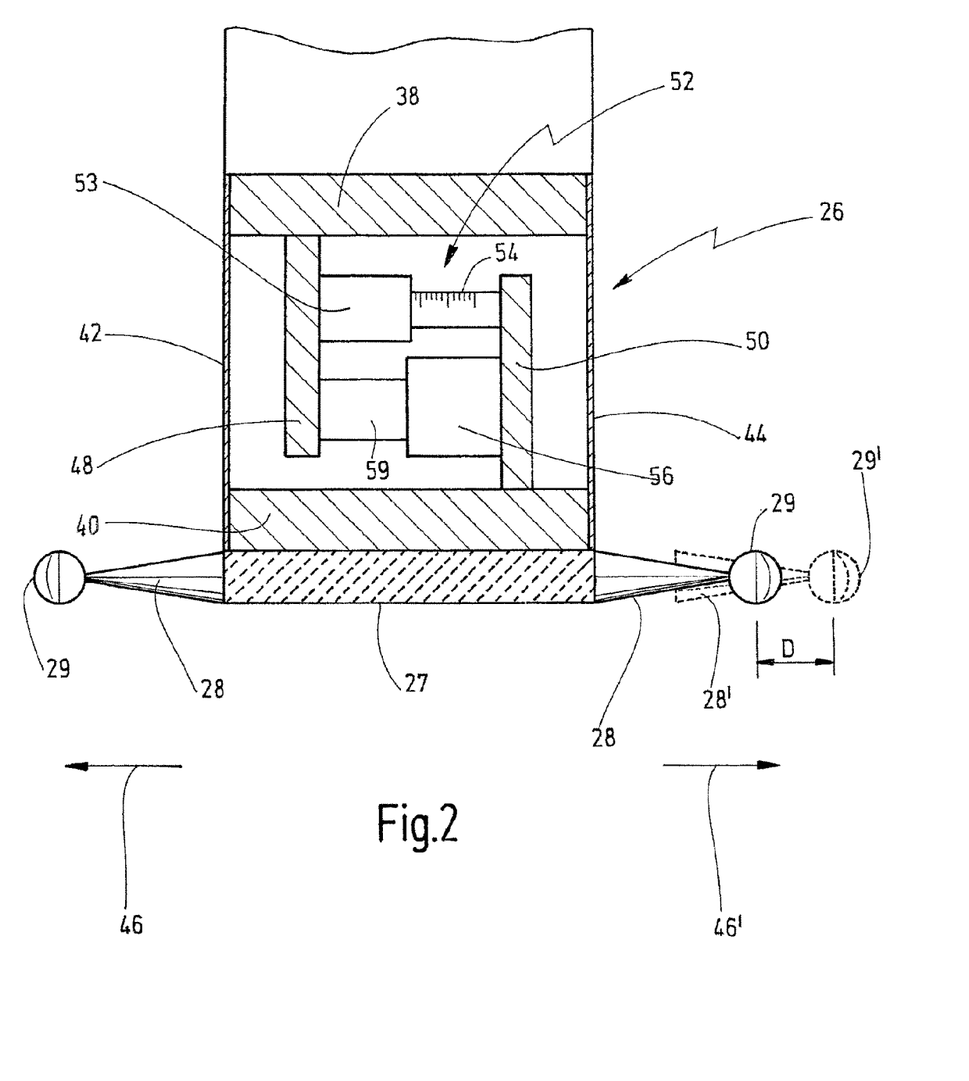
FIG. 2 shows a simplified representation of the probe head comprising a probe head sensors and a measurement force generator.

In a highly simplified schematic representation, FIG. 2 shows the basic functionality of the probe head 26. The probe head 26 has a body part 38 and a coupling part 40, which are in this case connected to one another by means of two leaf springs 42 and 44. The leaf springs 42, 44 form a spring parallelogram, which in this case permits movement of the coupling part 40 in the direction of arrow 46 (and back in the direction of the arrow 46'). The probe tool 27 with the styli 28 can therefore be deployed from its resting position through a distance D. The references 28' and 29' show one of the styli 28 with a ball 29 in the deployed position.

The displacement of the probe tool 27 relative to the body part 38 may be the result of touching the measurement object 30 at a measurement point. Advantageously, the displacement of the probe tool 27 is taken into account when determining the spatial coordinates. Furthermore, the displacement of the probe tool 27 may in the preferred exemplary embodiments be generated with the aid of a measurement force generator 56, as explained in more detail below. A limb 48, 50 is in this case respectively arranged on the body part 38 and on the moving part 40. The limbs 48, 50 are in this case parallel to the leaf springs 42, 44. Between the limbs 48, 50, a displacement detector 52 (here represented by a scale 54) and the measurement force generator 56 are arranged. The displacement detector 52 in this case comprises a measurement coil 53 in the form of a plunger coil. As an alternative or in addition, a Hall sensor, a piezoresistive sensor or another sensor may be envisioned as displacement detector 52, with the aid of which the spatial displacement of the probe tool 27 relative to the body part 38 (or more precisely the displacement of the spring parallelogram which is formed by the leaf springs 42, 44) can be determined. The measurement force generator 56 is in this case likewise formed as a plunger coil. With the aid of it, the two limbs 42 and 50 can be drawn together or pushed apart, by attracting or repelling a core 59 with the aid of a magnetic field generated in the coil.

In the highly simplified representation of FIG. 2, the probe head 26 only allows displacement of the probe tool 27 in the direction of the arrow 46. It is, however, clear to the person skilled in the relevant art that such a probe head 26 typically allows corresponding displacement in two further orthogonal spatial directions. This may, for example, be achieved with further spring parallelograms and/or with a diaphragm spring. The invention is not, however, restricted to this special probe head and may also be carried out with other probe heads which have a body part 38 and a coupling part 40 movable relative thereto.

Figure 3:
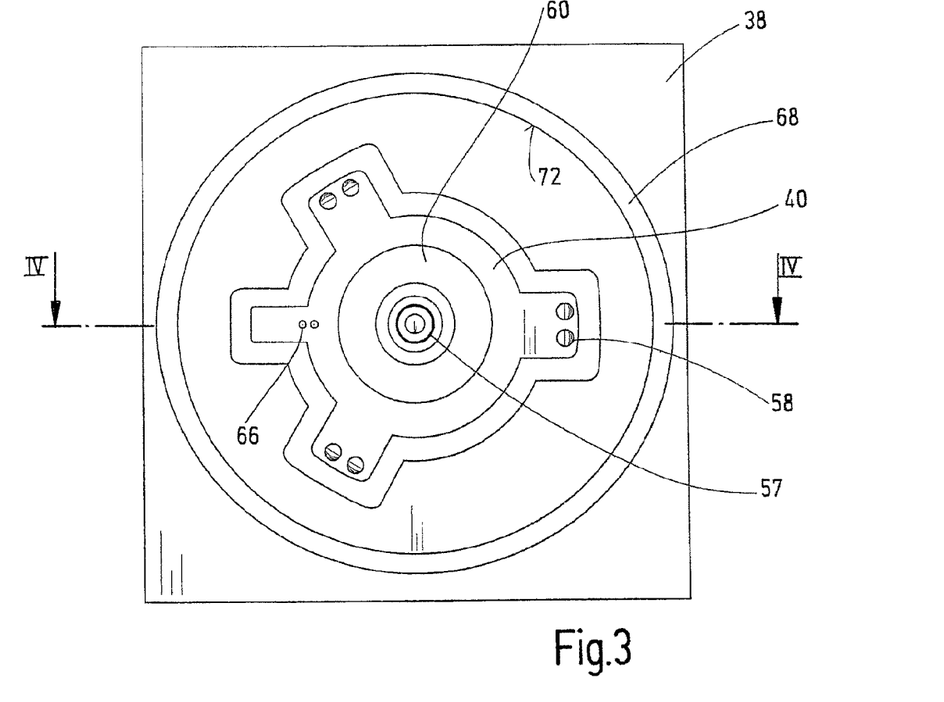
FIG. 3 shows a preferred exemplary embodiment of the probe head in a view on to the coupling part.
Figure 4:
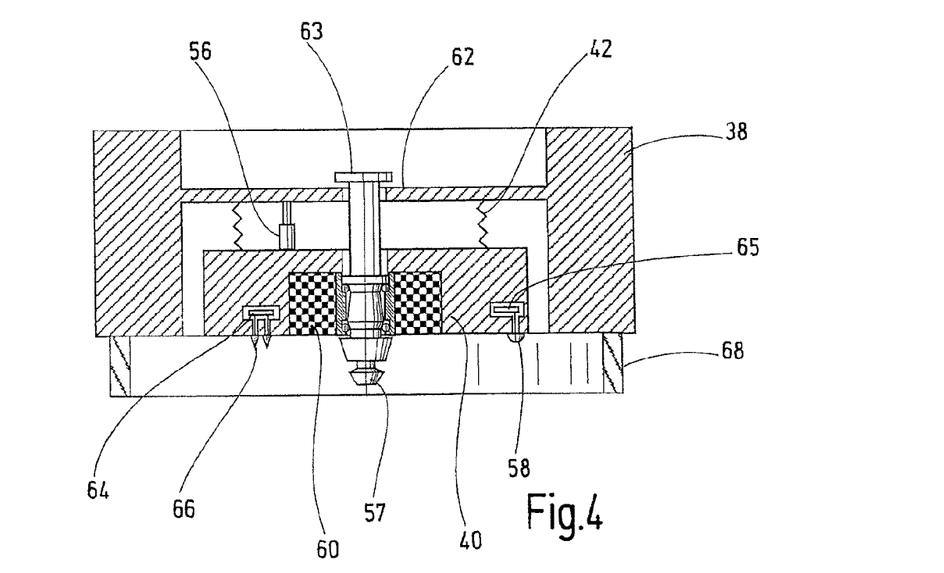
FIG. 4 shows the probe head of FIG. 3 in a sectional view along the line IV-IV.

FIG. 3 shows a preferred exemplary embodiment of the probe head 26 of FIG. 2 in a view from below (without the probe tool 27). FIG. 4 shows a simplified section of the probe head of FIG. 3 along a section line IV-IV.

The body part 38 holds the coupling part 40, which is preferably movable in three orthogonal spatial directions on the body part 38. For the sake of simplicity only two spring elements 42, which permit the three orthogonal movement directions, are shown in FIG. 4. The coupling part 40 in this case comprises a pin 57, which is guided in a perpendicularly mobile fashion in the coupling part 40 (this will be explained in more detail below with the aid of FIGS. 8 to 10). In the edge region of the coupling part 40, three pairs of latching balls 58 are arranged uniformly distributed in the circumferential direction. The arrangement is selected in such a way that the latching ball pairs respectively have the same radial distance from pin 57. The coupling part 40 furthermore has a magnet 60, here for example in the form of an annular electromagnet. As an alternative, the magnet may be a permanent magnet, which is strengthened or weakened by an additional electromagnet. The magnet 60 is in this case arranged concentrically with the pin 57 on the coupling part 40. The coupling part 40 in this case furthermore has a sensor 64 with two contacts 66, and a sensor 65. A roll motion projection 68 in the form of a cylindrical sleeve with an internal wall 72 is formed on the body part 38. The roll motion projection 68 in this case extends concentrically with the pin 57.

As already mentioned with reference to FIG. 2, the position of the coupling part 40 relative to the body part 38 can be modified with the aid of measurement force generators 56. These are conventionally used in order to generate a defined measurement force when sampling the measurement object. In order furthermore to permit advantageous movement of the pin 57 relative to the coupling part 40, in the preferred exemplary embodiment a stop 62 is provided which is formed here on the body part 38 or at least rigidly connected thereto. The stop 62 cooperates with a plate 63 which is formed on the upper end of the pin 57. In FIG. 4, the upper end of the pin 57 extends upward beyond the stop 62 and the plate 63 is arranged above the stop 62. When the coupling part 40 is pressed downward with the aid of measurement force generator 56, pin 57 follows this movement until the plate 63 encounters the stop 62 from above. Beyond this position, the pin 57 is blocked against further movement downward. The coupling part 40, on the other hand, can be pressed further downward with the aid of the measurement force generator 56. After the moment when the pin 57 is blocked on the stop 62 by means of the plate 63, the measurement force generator continues to move only the coupling part 40 downward, and no longer the pin 57. In other words, the measurement force generator 56 pushes the coupling part 40 downward relative to pin 57. Since pin 57 is formed with its lower free end holding a probe tool (as explained in more detail with reference to FIGS. 8 to 10), the distance between the coupling part 40 and the probe tool 27 can be varied, and in particular reduced, using the measurement force generator 56 and the stop 62. This is advantageously used in exemplary embodiments of the new coordinate measuring machine in order to move the coupling part 40 "smoothly" onto the probe tool 27 and subsequently fasten it with the magnet 60.

Figure 5:
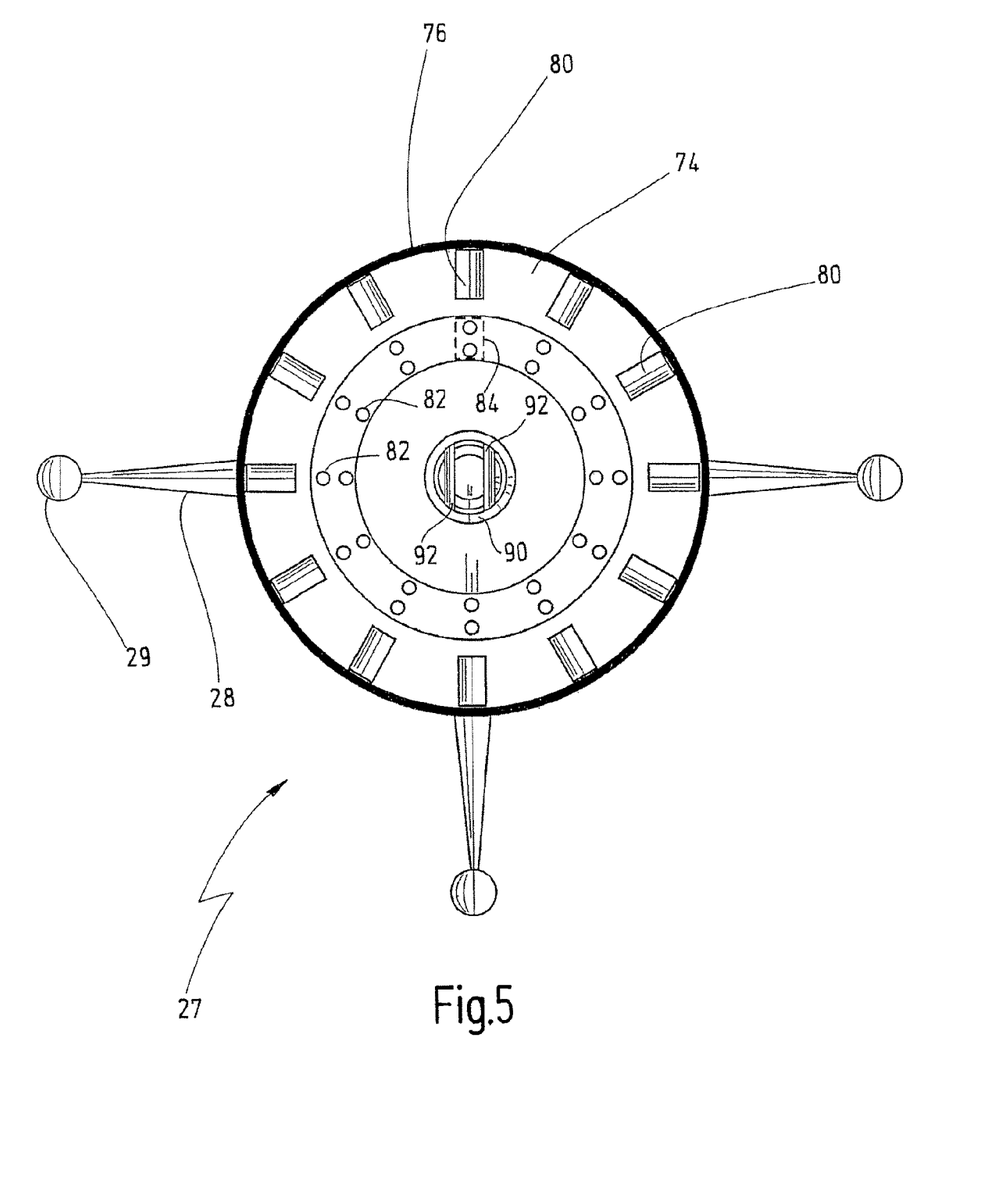
FIG. 5 shows a preferred exemplary embodiment of a probe tool for coupling to the coupling part of FIG. 3, FIGS. 6a and 6b show a first and a modified second exemplary embodiment of the latching mechanism of the probe tool of FIG. 5.

FIG. 5 shows a preferred exemplary embodiment of the probe tool 27 in a plan view of the interface, by which the probe tool is coupled to the coupling part 40. The probe tool 27 has a rotary plate 74, which is formed circularly in this case. Arranged on the outer circumference of the rotary plate 74, there is a traction element 76, here by way of example in the form of an O-ring. Instead of an O-ring, in other exemplary embodiments a flat belt of a rubber-elastic material is arranged on the outer edge of the rotary plate. The rotary plate 74 in this case comprises a plurality of latching rollers 80, each of which is radially aligned. The latching rollers 80 are uniformly distributed in the circumferential direction of the rotary plate 74. Radially inward of each latching roller 80, two contacts 82 are arranged. The contacts 82 in this case lie behind one another in the radial direction of the rotary plate 74, so as to provide an arrangement of radial contact pairs distributed in the circumferential direction. Each pair is part of an alignment determination element 84, which cooperates with the sensor 64 on the coupling part 40 (cf. FIG. 8).

In the preferred exemplary embodiments, each alignment determination element 84 includes an identification circuit, for example in the form of a memory chip, in which an individual encoding is stored. Each identification circuit therefore represents a unique item of information. The sensor 64 can, by means of the contacts 66, only read one identification circuit 84 at a time and determine the rotation angle position of the probe tool relative to the coupling part with the aid of the encoding which it reads. Preferably, at least one identification circuit contains further information items which represent the identity and/or properties of the probe tool 27 as a whole.

A reception element 90 in the form of a circular opening is arranged at the center of the rotary plate 74. In this case, two latching elements 92 are arranged in the reception element 90, by which the rotary plate 74 can be fastened on the lower free end of the pin 57. In the exemplary embodiment in FIG. 5, the latching elements 92 are two bars which are formed so as to engage in a groove on the lower free end of the 57 (cf. FIG. 9).

The probe tool 27 in this case carries the three styli 28 according to FIG. 1. The styli 28 are arranged below the rotary plate 74. The configuration of the probe tool is not restricted to the manner shown in FIG. 5. It is possible to use styli of different length and/or geometries. The number of styli used and/or the number of latching rollers may also differ from the exemplary embodiment represented.

Figure 6A:
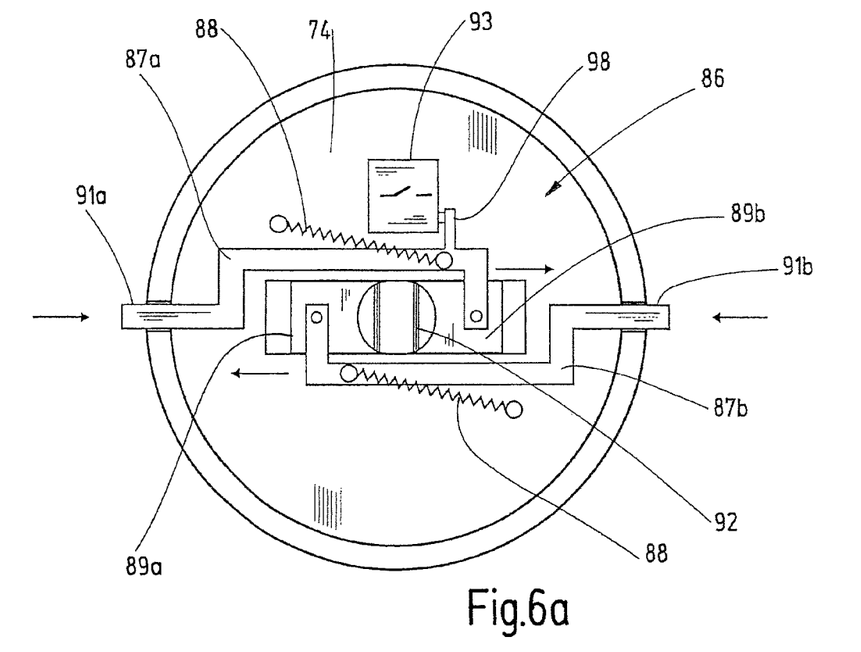

FIG. 6a shows a latching mechanism 86 with which the latching elements 92 can be opened or closed, in order to fasten the rotary plate 74 on the pin 57. The latching mechanism 86 is integrated in the rotary plate 74 in the preferred exemplary embodiments. Preferably, the latching mechanism 86 is arranged between the upper side of the rotary plate 74, which is shown in FIG. 5, and the stylus 28.

In the preferred exemplary embodiment, the latching mechanism 86 has two sliding members 87a, 87b movable counter to one another. Each sliding member 87a, 87b is biased into a resting position by means of a spring element 88. In the preferred exemplary embodiments, the spring elements 88 bias the sliding members 87 in a resting position in which the latching elements 92 clamp the rotary plate 74 on the pin 57. In the preferred exemplary embodiment, each sliding member 87 is respectively connected to a clamping piece 89a, 89b. The latching elements 92 are arranged on the clamping pieces 89a, 89b.

By pressing the sliding members 87a, 87b against one another in the direction of the arrows shown in FIG. 6a, the clamping pieces 89 can be pressed apart from one another. The effect of releasing the sliding members 87 is that the spring elements 88 press the latching elements 92 together again. In order to open the latching mechanism 86, each sliding member 87 has a free end 91 which protrudes outward beyond the outer circumference of the rotary plate 74. In the preferred exemplary embodiments, the free ends 91a, 91b of the sliding members 87a, 87b lie diametrically opposite one another on the outer circumference of the rotary plate 74.

Figure 6B:
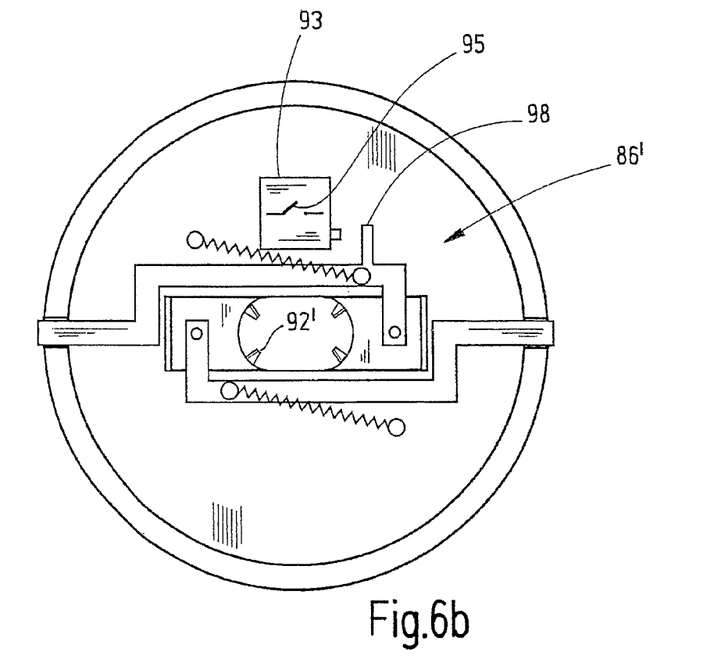

FIG. 6b shows the latching mechanism 86' in an operating position in which the latching elements 92 are in a release position, i.e. the latching mechanism 86' is opened. Conversely, FIG. 6a shows the latching mechanism 86 in the closed state, i.e. the latching elements 92 are in their latching position.

Furthermore, FIG. 6b represents a variant comprising latching elements 92'. The latching elements 92' are tooth-like projections on the clamping pieces 89, which engage radially in a groove on pin 57. Conversely, the latching elements 92 according to FIG. 6a are bar-shaped elements which are placed tangentially into the groove (cf. FIG. 9). In some exemplary embodiments, the tooth-like projections 92' are preferred since they break more easily in the event of a collision of the probe tool with the measurement object and therefore permit emergency unlatching of the probe tool. Conversely, the bar-shaped latching elements 92 according to FIG. 6a are preferred when particularly secure retention of the probe tool on the probe head is desired.

In the preferred exemplary embodiments, the latching mechanism 86 comprises a detector 93 designed to detect the latching position and/or the release position of the latching element 92. In the exemplary embodiments according to FIG. 6, the detector 93 is a microswitch comprising a switching contact 95, which is arranged in series with all the contact pairs 92 of the rotary plate 74. The switching contact 95 may be a mechanical contact or an electronic switch, for instance in the form of a transistor. The switching position of the switch 93 is influenced by means of the sliding member 87a. In the position shown in FIG. 6a, a lug 89 of the sliding member 87a touches the switch 93. The switching contact 95 is closed by means of the lug 98. In this position, the sensor 64 in the probe head 27 can read that identification circuit 84 whose contacts 82 are in contact with the contacts 66 on the coupling part (cf. FIG. 4 and FIG. 10). In the position shown in FIG. 6b, on the other hand, the lug 98 is separated from the switch 93. The switching contact 95 is consequently opened and the sensor 64 cannot read any of the identification circuits 84. The absence of an identification signal of one of the identification circuits 84 is a signal with which the detector 93 reports that the latching mechanism 86 is not closed properly.

In other words, the detector 93 delivers a signal of one of the identification circuits 84 to the sensor 64 only when rotary plate 74 bears on the contacts 66 and the latching mechanism 86 is closed.

Figure 7:
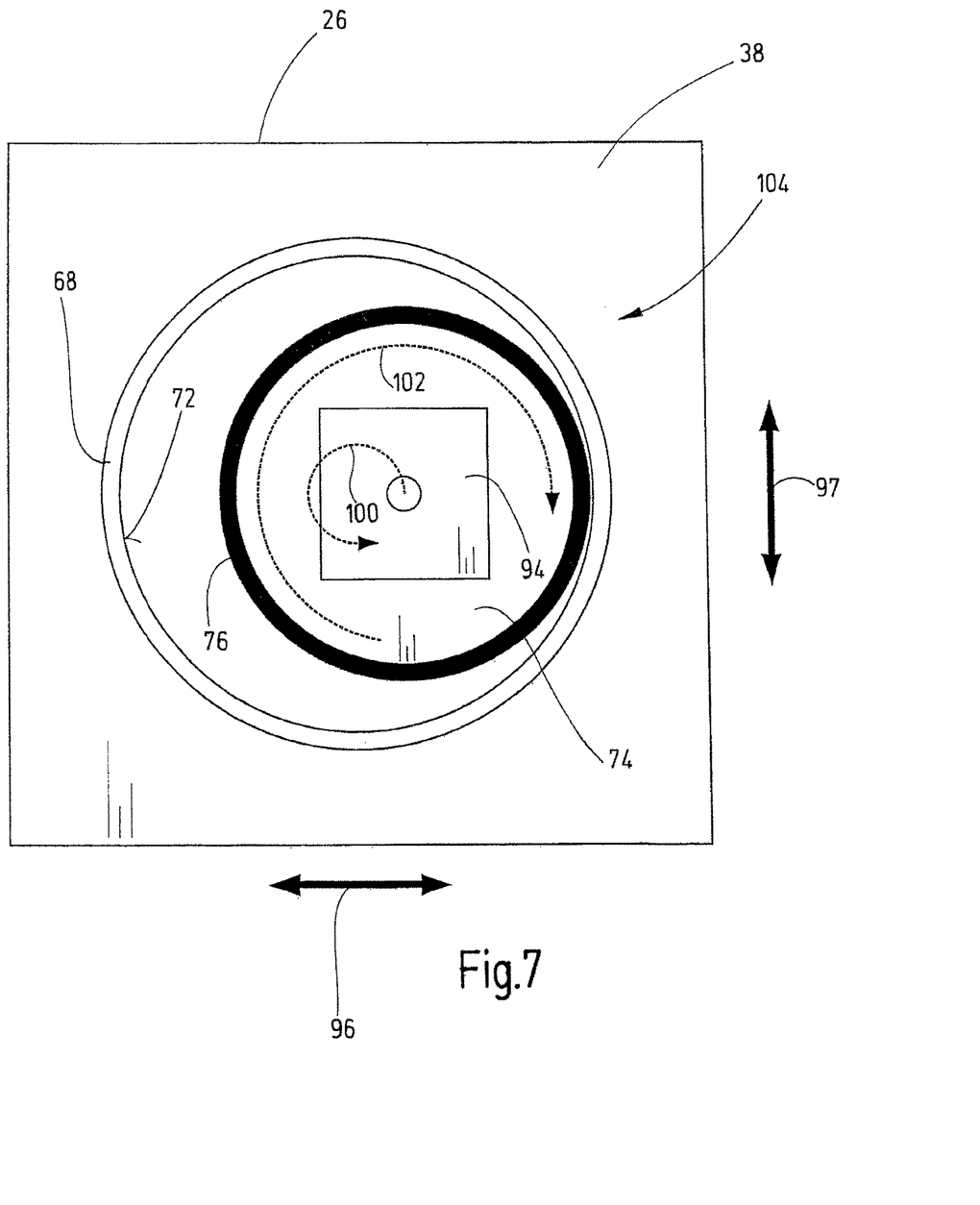
FIG. 7 shows a simplified representation of the preferred probe head during rotation of the probe tool.

FIG. 7 shows the probe head 26 of FIG. 3 or 4 and the rotary plate 74 of FIG. 5 in a simplified representation from below. The probe head 26 is in this case shown merely by the outer contour of the body part 38 and the roll motion projection 68. The rotary plate 74 is shown here with a reception unit 94 for styli 28 and the traction element 76. In order to move the rotary plate 74 relative to the probe head, the measurement force generators 56 are used in this case, which generate movements in the direction of the double arrows 96 and 97. The directions 96 and 97 are mutually orthogonal and correspond here to the movement directions x and y of the coordinate measuring machine 10. With the aid of the movements 96, 97, it is possible to move the rotary plate 74 inside the roll motion projection 68. In the position represented, the rotary plate 74 with the traction element 76 bears on the inner surface 72 and forms a friction fit on the roll motion projection 68. As an alternative, the rotary plate 74 could also enter into a form fit with the roll motion projection 68. For example, the rotary plate 74 could be formed as a gearwheel on the outer circumference, which meshes with matching teeth on the roll motion projection.

By a circular movement (arrow 100) of the rotary plate 74, which in this case takes place concentrically with the roll motion projection 68, rotation of the rotary plate 74 in the direction of the arrow 102 is achieved. The circular movement is generated by corresponding control of the measurement force generators along the arrows 96 and 97. The movement 102 is carried out until the stylus has reached a desired rotation position. Subsequently, the rotary plate 74 can be moved back into its central resting position. Preferably, the resting position lies centrally with respect to the roll motion projection 68. Owing to the different radii of the roll motion projection and of the traction element 76, these elements form a friction drive 104 which, with appropriate dimensioning, determines the rotational speed of the rotary plate 74.

Figure 8:
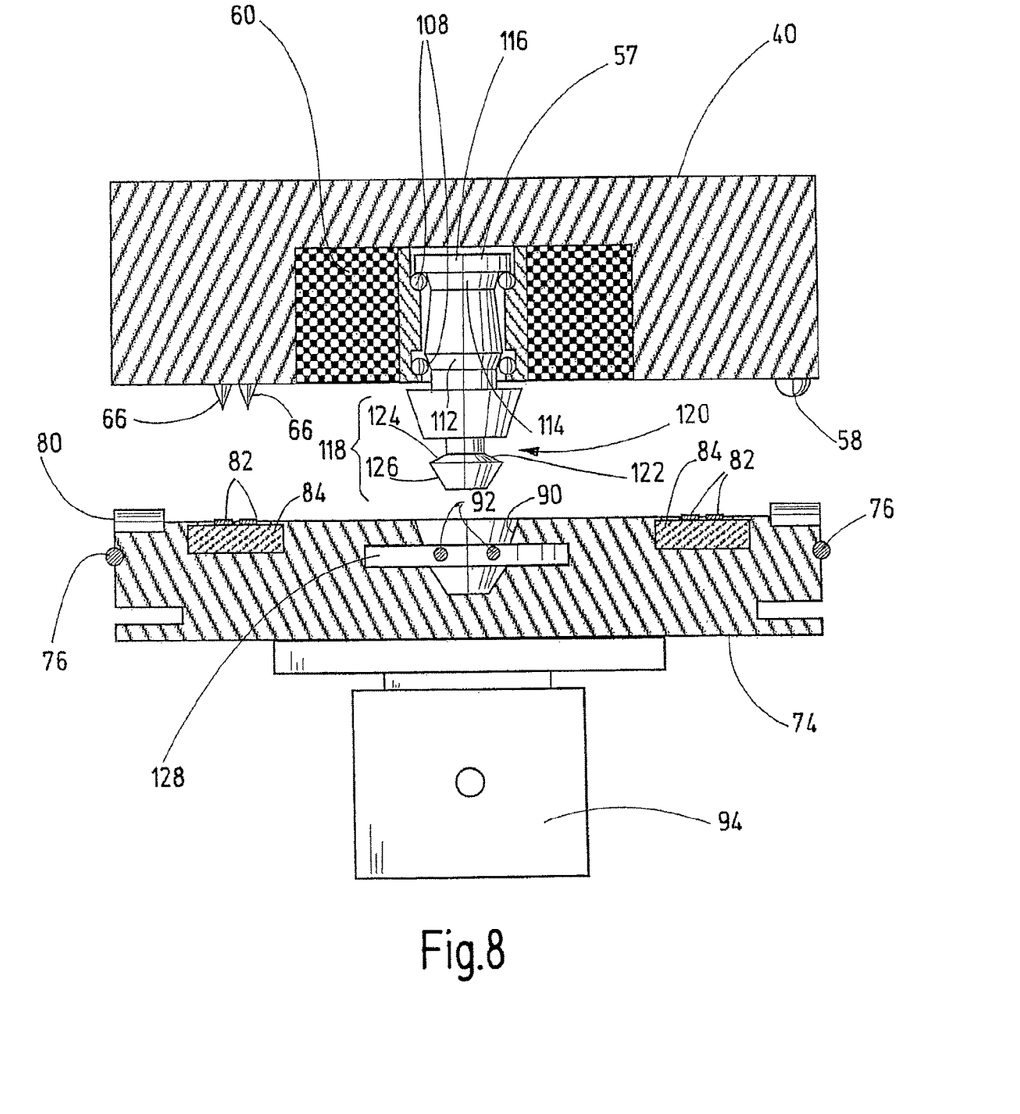
FIGS. 8 to 10 show the coupling part of the probe head of FIGS. 3 and 4 in various operating positions.

FIG. 8 shows a sectional view of the coupling part 40 and of the rotary plate 74 in a first operating position. For the sake of simplicity, pin 57 is not shown over its entire length here. In particular, omitted in this case is the upper end comprising the plate 63, which can be retained on the stop 62 (FIG. 4), in order to move the coupling part 40 relative to the pin 57.

The coupling part 40 comprises the ring magnet 60, which concentrically encloses the retaining device 106. The retaining device 106 in this case comprises two bearing elements 108 in the form of rolling bearings, which are configured annularly and are arranged concentrically with the pin 57.

The pin 57 is arranged inside the retaining device 106. It has two conical sections 112 and 114. In the represented position of the pin 57, the conical sections 112, 114 bear on the bearing elements 108 without play. That end of the centering pin 57 which lies inside the coupling part 40 forms a retaining projection 116, which secures the centering pin 57 inside the retaining device 106 against high tensile forces. That section 118 which lies outside the coupling part 40 is essentially formed conically. The section 118 comprises a groove 120, which is formed in the circumferential direction of the centering pin 57. That wall 122 of the groove 120 which faces the coupling part 40 forms a further conical section 124, which is oriented opposite to the conical sections 112 and 114. The free end of the centering pin 57 forms a further conical section 126, the orientation of which corresponds to the orientation of the conical sections 112, 114. Furthermore, one of the latching balls 58 and the contacts 66 can be seen here.

The rotary plate 74 carries the traction element 76. On that side of the rotary plate 74 which faces the coupling part 40, two of the latching rollers 80 and two associated identification circuits 84 are represented. The reception element 90 is essentially formed conically, so that secure seating of the pin 57 inside the reception element 90 and automatic centering are ensured. Inside the reception element 90, there is a cylindrical recess 128, inside which the latching elements 92 can be moved. The rotary plate 74 holds the reception unit 94. Styli 28 are not represented for the sake of clarity.

Figure 9:
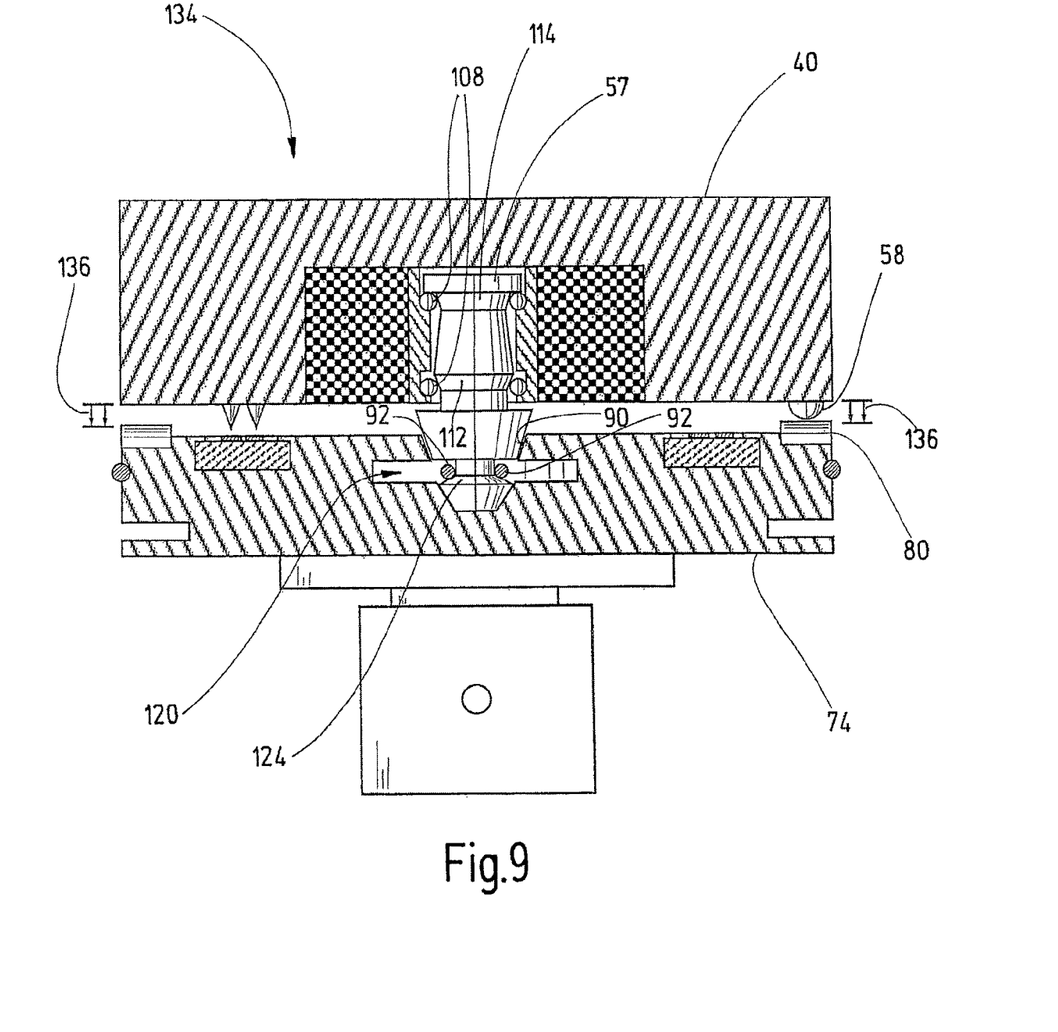

FIG. 9 shows the coupling part 40, the pin 57 and the rotary plate 74 in a second operating position. In contrast to FIG. 8, the rotary plate 74 is in this case fastened on the pin 57. The latching elements 92 are in their latching position. The pin 57 is fitted into the reception element 90, so that the latching elements 92 engage in the groove 120. The conical section 124 therefore forms a support for the latching elements 92, and the groove 120 forms a closure with the latching elements 92.

In the position of the rotary plate 74 as represented in FIG. 9, a distance remains between the latching ball 58 and the latching roller 80 lying closest. It is therefore possible to rotate the rotary plate 74 with the centering pin 57. The conical sections 112 and 114 in this case rest without play on the bearing elements 108. The pin 57 is therefore in a rotation position 134 which allows rotation of the rotary plate 74.

By virtue of an axial movement of the coupling part 40 in the direction of the movement arrows 136 (i.e. in the longitudinal direction of the axle and therefore parallel to the rotation axis of the rotary plate 74), the rotary plate 74 can be brought from the position shown in FIG. 9 into a position close to the coupling part 40. Advantageously, the coupling part 40 is pressed downward with the aid of the measurement force generator 56 from the body part 38 to such an extent that the plate 63 (FIG. 4) at the upper end of the pin 57 moves against the stop 62 and thereafter no longer alters its position relative to the body part 38. The coupling part 40, on the other hand, is pressed further downward with the aid of the measurement force generator 56 and therefore moves toward the rotary plate 74 at the lower end of the pin 57.

Figure 10:
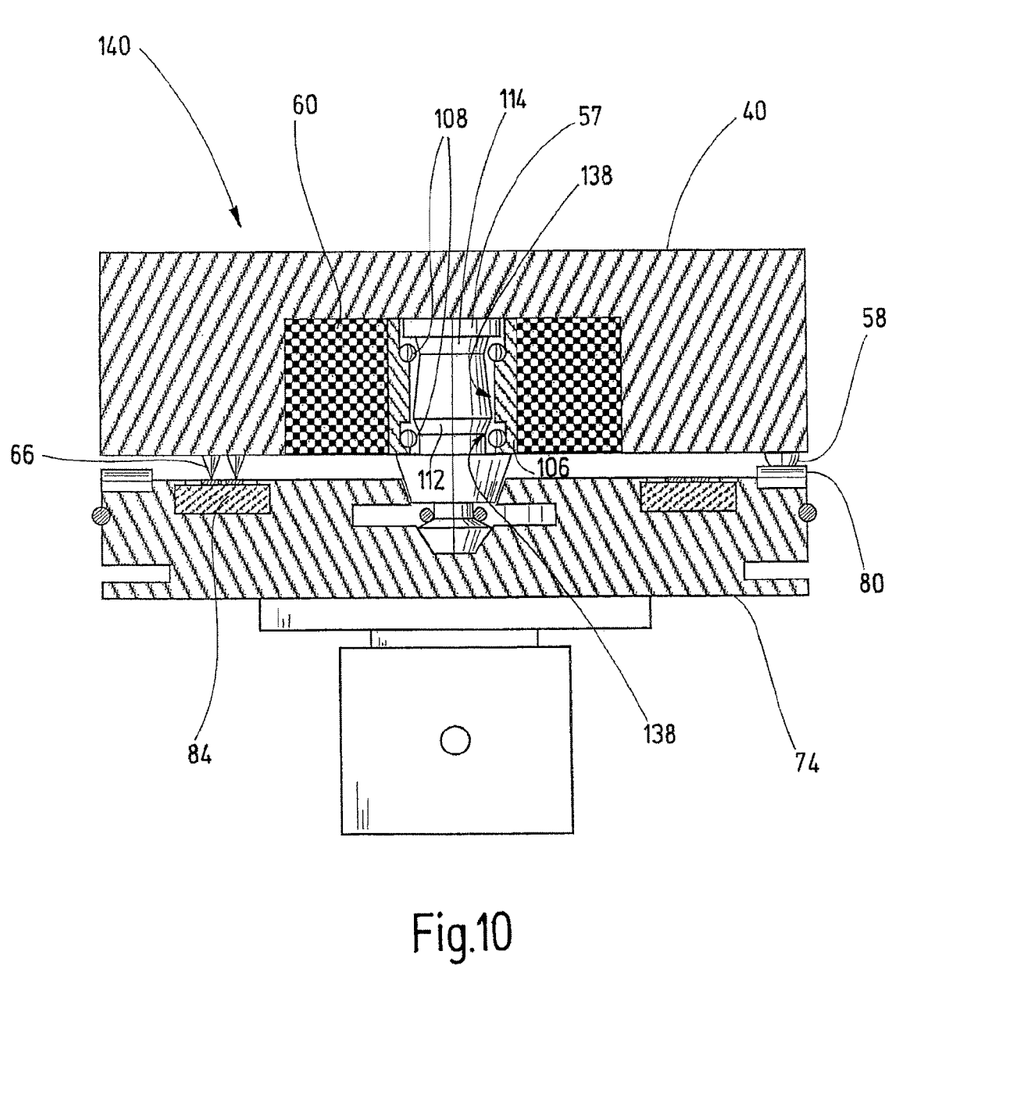

FIG. 10 shows the coupling part 40, the pin 57 and the rotary plate 74 of FIGS. 8 and 9 in a corresponding third operating position. Furthermore, the electromagnet 60 is now magnetized in order to fix the rotary plate 74 in the position close to the coupling part 40. In this proximal position, the latching balls 58 cooperate with the latching rollers 80 lying closest and form a kinematically determined three-point bearing. The contact of the latching balls 58 with the latching rollers 80 is advantageously detected with the aid of the sensor 65 (FIG. 4).

Owing to the fact that the pin 57 has been displaced upward relative to the coupling part 40, the conical sections 112 and 114 are now arranged at a distance 138 from the bearing elements 108. Owing to these distances 138, the pin 57 now has play inside the retaining device 106. This prevents the pin 57 from generating undesired counter-forces, which work against the alignment of the rotary plate 74 by the latching. The pin 57 is therefore in a defined latching position 140.

What is claimed is:

1. A probe head for a coordinate measuring machine for determining spatial coordinates on a measurement object, comprising:
   a coupling part having a retaining pin, on which a probe tool is arranged, the retaining pin defining a first axis,
   a body part on which the coupling part is moveably mounted,
   at least one measurement force generator configured to effect a defined movement of the coupling part relative to the body part, and
   a roll motion projection formed on the body part, said roll motion projection having an inner cylindrical surface,
   wherein the probe tool comprises at least one stylus for touching the measurement object and a rotary plate removably connected to the coupling part via the retaining pin so that the rotary plate is rotatable about said first axis, said at least one stylus projecting from said rotary plate at a non-zero angle relative to said first axis, said rotary plate having an outer circumferential surface configured to be rolled along said inner cylindrical surface of the roll motion projection as a result of the defined movement of the coupling part relative to the body part in order to set a rotational position of the at least one stylus while the probe tool is coupled to the body part,
   wherein the rotary plate comprises a latching mechanism having at least one adjustable latching element and a detector, the latching element having a latching position in which it engages the retaining pin to secure the rotary plate on the retaining pin, and at least one release position in which it releases the retaining pin, and
   wherein the detector is configured to generate a signal which is representative of at least one from the latching position and the release position.

2. The probe head of claim 1, wherein the rotary plate has at least one identification circuit, and the coupling part has a sensor for reading the at least one identification circuit.

3. The probe head of claim 2, wherein the detector is designed to prevent the identification circuit from being read by the sensor depending on the latching position or the release position.

4. The probe head of claim 2, wherein the detector comprises an electrical switch, which is arranged electrically in series with the at least one identification circuit.

5. The probe head of claim 2, wherein the rotary plate has a plurality of identification circuits, each identification circuit being representative of one of a plurality of defined rotational positions.

6. The probe head of claim 2, wherein the rotary plate has a plurality of rotary plate latching elements, which define a plurality of defined rotational positions, and the at least one identification circuit has a number of electrical contacts which are arranged radially with respect to at least one of the rotary plate latching elements.

7. The probe head of claim 6, wherein the coupling part further comprises a plurality of coupling plate latching elements and a further sensor, the further sensor being designed to detect mechanical contact between at least one coupling plate latching element and at least one rotary plate latching element.

8. The probe head of claim 1, wherein the latching mechanism comprises two sliding members, which can be displaced counter to one another in order to bring the at least one latching element into the release position.

9. The probe head of claim 1, wherein the inner cylindrical surface of the roll motion projection defines a second axis and further wherein the rotary plate is arranged eccentrically with respect to said second axis.

10. The probe head of claim 1, further comprising a traction element, which is arranged between the outer circumferential surface of the rotary plate and the inner cylindrical surface of the roll motion projection.

11. The probe head of claim 1, further comprising a stop arranged on the body part, said stop being designed to fix the retaining pin relative to the coupling part.

12. The probe head of claim 11, wherein the coupling part is arranged between the stop and the rotary plate.

13. A probe tool for a probe head having a retaining pin with a free end for holding the probe tool, said retaining pin defining a first axis, and a body part having a roll motion projection with an inner cylindrical surface, said probe tool comprising at least one stylus for touching a measurement object and comprising a rotary plate designed to be coupled to the probe head by means of said retaining pin in one of a plurality of defined rotational positions, wherein the rotary plate comprises a latching mechanism having at least one adjustable latching element and a detector, the latching element having a latching position in which it engages the free end and thereby secures the rotary plate to the retaining pin so that the rotary plate is journalled to said retaining pin and rotatable about said first axis, and at least one release position in which it releases the retaining pin, and wherein the detector is configured to generate a signal which is representative of at least one of the latching position and the release position, and further wherein said rotary plate further comprises an outer circumference having a traction element for engaging said inner cylindrical surface of the roll motion projection on the body part when said rotary plate is coupled to the probe head.

14. A probe head for a coordinate measuring machine for determining spatial coordinates on a measurement object, the probe head comprising a coupling part having a retaining pin with a free end, on which a probe tool is detachably arranged, said retaining pin defining a first axis, the probe tool comprising at least one stylus for touching the measurement object and a rotary plate, which is coupled to the coupling part by means of the retaining pin in one of a plurality of defined rotational positions, wherein the rotary plate comprises a latching mechanism having at least one adjustable latching element and a detector, the latching element having a latching position in which it engages the free end and thereby secures the rotary plate to the retaining pin so that the rotary plate is journalled to said retaining pin and rotatable about said first axis, and at least one release position in which it releases the retaining pin, and the detector generating a signal which is representative of at least one of the latching position and the release position; and further comprising at least one measurement force generator for imparting a first linear motion to said coupling part in a first linear direction transverse to said first axis.

15. The probe head of claim 14, wherein the rotary plate has at least one identification circuit, and the coupling part has a sensor for reading the at least one identification circuit.

16. The probe head of claim 15, wherein the detector is designed to prevent the identification circuit from being read by the sensor depending on the latching position or the release position.

17. The probe head of claim 15, wherein the rotary plate has a plurality of rotary plate latching elements, which define the plurality of defined rotational positions, and the at least one identification circuit has a number of electrical contacts which are arranged radially with respect to at least one of the rotary plate latching elements.

18. The probe head of claim 17, wherein the coupling part comprises a plurality of coupling plate latching elements and a further sensor, the further sensor being designed to detect mechanical contact between at least one coupling plate latching element and at least one rotary plate latching element.

19. The probe head of claim 14, further comprising a body part having a roll motion projection on which the rotary plate can be rolled by movement of the coupling part, and comprising at least one measurement force generator configured to effect a roll movement of the rotary plate along the roll motion projection.

20. The probe head of claim 14, further comprising a stop, by which the retaining pin can be fixed relative to the coupling part, said stop being arranged on a body part of the probe head.

21. The probe head of claim 14, further comprising a second measurement force generator for imparting a second linear motion to said coupling part in a second linear direction perpendicular to said first linear direction.

22. The probe head of claim 21, wherein said first and second linear directions are mutually orthogonal to said first axis.

23. The probe head of claim 22, further comprising a body part having a roll motion projection having an inner cylindrical surface defining a second axis, and wherein said rotary plate has an outer circumferential surface configured to be rolled along said inner cylindrical surface, and further wherein said first axis is arranged eccentrically with respect to said second axis.

24. The probe head of claim 13, wherein said traction element comprises gear teeth configured to engage gear teeth formed on said inner cylindrical surface.

* * * * *